United States Patent
VanBlon et al.

(10) Patent No.: US 11,134,392 B2
(45) Date of Patent: Sep. 28, 2021

(54) METHOD AND DEVICE FOR MANAGING EXTENDER NODES FOR A WIRELESS DEVICE

(71) Applicant: Lenovo (Singapore) Pte. Ltd., New Tech Park (SG)

(72) Inventors: Russell Speight VanBlon, Raleigh, NC (US); Robert James Kapinos, Durham, NC (US); Scott Wentao Li, Cary, NC (US); Grigori Zaitsev, Durham, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 24 days.

(21) Appl. No.: 16/732,464

(22) Filed: Jan. 2, 2020

(65) Prior Publication Data
US 2021/0211890 A1  Jul. 8, 2021

(51) Int. Cl.
| H04W 4/00 | (2018.01) |
| H04W 16/18 | (2009.01) |
| H04W 24/02 | (2009.01) |
| H04W 88/10 | (2009.01) |
| H04W 8/00 | (2009.01) |
| H04W 64/00 | (2009.01) |
| H04W 16/26 | (2009.01) |
| H04W 84/22 | (2009.01) |

(52) U.S. Cl.
CPC .......... *H04W 16/18* (2013.01); *H04W 8/005* (2013.01); *H04W 16/26* (2013.01); *H04W 24/02* (2013.01); *H04W 64/003* (2013.01); *H04W 84/22* (2013.01); *H04W 88/10* (2013.01)

(58) Field of Classification Search
CPC ..... H04W 16/18; H04W 8/005; H04W 16/26; H04W 24/02; H04W 64/003; H04W 84/22; H04W 88/10
See application file for complete search history.

(56) References Cited

U.S. PATENT DOCUMENTS

| 2016/0302096 A1* | 10/2016 | Chari | H04W 24/08 |
| 2019/0150002 A1* | 5/2019 | Ligata | H04W 16/20 |
| | | | 370/329 |
| 2019/0173973 A1* | 6/2019 | McFall | G06F 40/211 |

* cited by examiner

*Primary Examiner* — Erika A Washington
(74) *Attorney, Agent, or Firm* — Dean D. Small; The Small Patent Law Group, LLC

(57) ABSTRACT

A computer implemented method, device, and computer program product for managing extender nodes for a wireless device. The method identifies request attributes of interest (AOI) associated with a request to route a communication stream for a wireless device. The method detects, at a current physical location of the wireless device, candidate extender nodes to extend a network signal. The method analyzes the candidate extender nodes, based on the request AOI, to determine one or more of: i) predictive characteristics of interest (COI) associated with the corresponding candidate extender node; and ii) an announced behavior COI broadcast by one or more of the candidate extender nodes. The method determines a resultant extender node from the candidate extender nodes based, at least in part, on one or more of the predictive COI and the announced behavior COI. The resultant extender node is determined pursuant to managing switching during performance of the request.

20 Claims, 4 Drawing Sheets

METHOD AND DEVICE FOR MANAGING EXTENDER NODES FOR A WIRELESS DEVICE

BACKGROUND

Embodiments herein generally relate to methods and systems for managing extender nodes for a wireless device.

Wireless communications systems are widely deployed to support various types of communications content among various types of wireless devices. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems. Providing adequate wireless signal coverage in a wireless communication system requires that enough access points (e.g., proprietary towers, $3^{rd}$ party towers, and the like) be placed in an environment to limit or eliminate any "dead spots" within the environment. A dead spot is a region within an environment for which the access points do not provide or are incapable of providing sufficient wireless signal coverage to support communication on wireless devices located therein. In order to increase performance of wireless devices, device manufacturers continue to migrate from 4G systems to higher frequency, higher performance 5G systems. Existing wireless communications systems typically have an access point density to support adequate wireless signal coverage for 4G wireless devices. However, existing wireless communications systems will exhibit increased dead spots for 5G wireless devices due to 5G signals having a shorter range than 4G signals.

One method to augment wireless signal coverage in a wireless communication network includes using wireless endpoint devices as extender nodes to extend the signal coverage of the wireless communication network. Methods to address inadequate signal coverage by using wireless endpoint devices as extender nodes only determine which extender node a given wireless device will connect to based on detecting the signal strength of a plurality of available extender nodes. Determining an extender node for a given wireless device based on signal strength alone may result in decreased performance of the wireless device. For example, many wireless endpoint devices are mobile devices which may leave the environment while being used by a given wireless device as an extender node, resulting in a lost network connection and lost time at the given wireless device due to renegotiating a new connection with another extender node. Accordingly, a need remains for methods, devices, and computer program products that manage extender nodes for wireless devices that avoid unnecessary connection renegotiations that adversely impact or reduce functionality of the wireless device for an end user.

SUMMARY

In accordance with embodiments herein, a method is provided. The method operates under control of one or more processors configured with specific executable program instructions. The method identifies request attributes of interest (AOI) associated with a request to route a communication stream for a wireless device. The method detects, at a current physical location of the wireless device, candidate extender nodes to extend a network signal. The method analyzes the candidate extender nodes, based on the request AOI, to determine one or more of: i) predictive characteristics of interest (COI) associated with the corresponding candidate extender node of the candidate extender nodes; and ii) an announced behavior COI broadcast by one or more of the candidate extender nodes. The method determines a resultant extender node from the candidate extender nodes based, at least in part, on one or more of the predictive COI and the announced behavior COI. The resultant extender node is determined pursuant to managing switching during performance of the request.

Optionally, the predictive COI may be indicative of whether the corresponding candidate extender node is likely to remain available during performance of the request to route communication content. The determining may include determining the resultant extender node from the candidate extender nodes to limit a number of network switches utilized with the request. The analyzing may include determining one or more analyzed behaviors of a candidate extender node. The analyzed behavior may be determined based on one or more of a stationary status, a collection of historical location data, a collection of historical calendar data, a collection of historical availability data, current calendar data, or future calendar data associated with one or more of the extender node or a user associated with the extender node. The announced behavior may be based on one or more of a user-selected status or a user-selected schedule. The predictive COI may not be an IP address reservation. The determining may include ranking the candidate extender nodes based on the predictive COI and selecting, as the resultant extender node, a highest-ranking candidate extender node. The one or more AOI may include a duration for routing the communication stream, one or more types of content associated with the communication stream, or one or more types of services associated with the communication stream. Detecting may include detecting the candidate extender nodes having a signal strength exceeding a threshold value.

In accordance with embodiments herein, a device is provided. The device includes one or more processors and memory storing program instructions accessible by the one or more processors. The one or more processors are responsive to execution of the program instructions. The one or more processors identify request attributes of interest (AOI) associated with a request to route a communication stream for a wireless device. The one or more processors detect, at a current physical location of the wireless device, candidate extender nodes to extend a network signal. The one or more processors analyze the candidate extender nodes, based on the request AOI, to determine one or more of: i) predictive characteristics of interest (COI) associated with the corresponding candidate extender node of the candidate extender nodes and ii) an announced behavior COI broadcast by one or more of the candidate extender nodes. The one or more processors determine a resultant extender node from the candidate extender nodes based, at least in part, on one or more of the predictive COI and the announced behavior COI. The resultant extender node is determined pursuant to managing switching during performance of the request.

Optionally, the predictive COI may be indicative of whether the corresponding candidate extender node is likely to remain available during performance of the request to route communication content. The one or more processors, as part of the determine, may determine the resultant extender node from the candidate extender nodes to limit a number of network switches associated with the request. The one or more processors, as part of the analyze, may determine one or more analyzed behaviors of a candidate extender node as predictive COI. The one or more processors may determine one or more analyzed behaviors based on one or more of a stationary status, a collection of historical location data, a collection of historical calendar data, a collection of historical availability data, current calendar data, or future calendar data associated with one or more of the extender node or a user associated with the extender node. The announced behavior may be based on one or more of a user-selected status or a user-selected schedule. The predictive COI may not be an IP address reservation. The one or more processors, as part of the determine, may rank the candidate extender nodes based on the predictive COI and selecting, as the resultant extender node, a highest-ranking candidate extender node. The one or more AOI may include a duration for routing the communication stream, one or more types of content associated with the communication stream, or one or more types of services associated with the communication stream.

In accordance with embodiments herein, a computer program product is provided. The computer program product includes a non-transitory signal computer readable storage medium storing computer executable code to identify request attributes of interest (AOI) associated with a request to route a communication stream for a wireless device, detect candidate extender nodes to extend a network signal at a current physical location of the wireless device, analyze the candidate extender nodes, based on the request AOI, to determine one or more of i) predictive characteristics of interest (COI) associated with the corresponding candidate extender node of the candidate extender nodes and ii) an announced behavior COI broadcast by one or more of the candidate extender nodes, and determine a resultant extender node from the candidate extender nodes based, at least in part, on one or more of the predictive COI and the announced behavior COI. The resultant extender node is determined pursuant to managing switching during performance of the request.

Optionally, the predictive COI may be indicative of whether the corresponding candidate extender node is likely to remain available during performance of the request to route communication content. The computer executable code may, as part of the determine, determine the resultant extender node from the candidate extender nodes to limit a number of network switches associated with the request. The computer executable code may, as part of the analyze, determine one or more analyzed behaviors of a candidate extender node, as predictive COI, based on one or more of a stationary status, a collection of historical location data, a collection of historical calendar data, a collection of historical availability data, current calendar data, or future calendar data corresponding to the candidate extender node.

DETAILED DESCRIPTION

Figure 1:
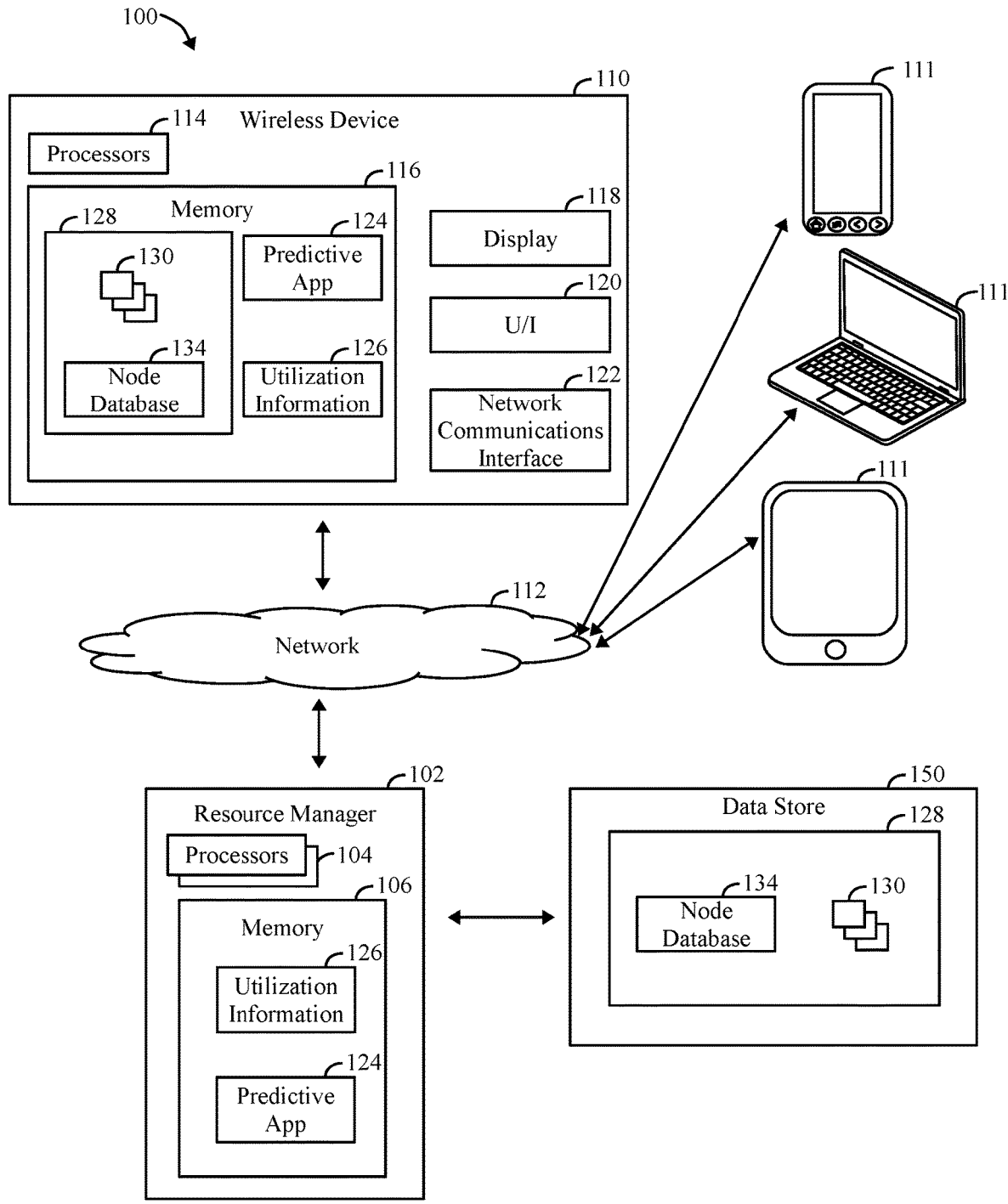
FIG. 1 illustrates a system for managing extender nodes for a wireless device in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Terms

The term "extender node" shall mean any device associated with a wireless network having a radio that is capable of re-broadcasting, extending, and/or boosting a signal transmitted by one or more hardwired access points (e.g., towers, routers, or the like) in a wireless communications system or network. Extender nodes may expand and/or strengthen existing signal coverage provided by one or more access points by repeating the signal from the access point. Extender nodes may be wireless endpoint devices and/or stationary devices. Examples of extender nodes include, for example and without limitation, desktop computers, laptop computers, tablets, smartphones, smart appliances (e.g., wireless speakers, smart televisions, smart home control systems, and the like), and dedicated wireless range extenders.

The term "request attributes of interest" or "request AOI" shall mean various attributes associated with a request generated by a wireless device to route a communication stream that may be of interest in connection with managing switching of the wireless device during performance of the request. Managing switching of the wireless devices includes avoiding unnecessary connection renegotiations with extender nodes and/or limiting (e.g., minimizing) the number of switches between one or more of extender nodes and access nodes associated with the network. Examples of request AOI include, but are not limited to, a duration for routing the communication stream, one or more types of content associated with the communication stream, or one or more types of services associated with the communication stream. The duration for routing the communication stream may be user-selected based on an intended duration for remaining at a location, based on past device location data, based on calendar data, and the like. The types of content may include video, audio, pictures, games, messages, voice calls, any other type of streaming media, and, where applicable, the level of graphic intensity associated therewith. The types of services may include movie and television streaming services, online video sharing services, music streaming services, electronic book streaming services, social media services, gaming services, and the like. It is understood that variations of the request attributes of interest, or alternative request attributes of interest, may be utilized in accordance with embodiments herein.

The term "IP address reservation" shall mean a reservation defined by a host configuration protocol, such as the Dynamic host configuration protocol (DHCP) that is assigned an amount of time that a network device can use an IP Address in a network. The IP Address is reserved for that device until the reservation expires. For example, a DHCP lease is one type of IP address reservation.

The term "predictive characteristic of interest" or "predictive COI" refers to "predictive" as the COI are not based on an IP address reservation negotiated by an extender node. Instead, the "predictive COI" shall mean types of analyzed behavior related to an extender node. The predictive COI indicates whether an extender node is likely to remain available during performance of the request to route communication content. Types of analyzed behavior for an extender node may be determined based on statistical analysis of and/or trends based on one or more of a stationary status, a collection of historical location data, a collection of historical calendar data, a collection of historical availability data, current calendar data, or future calendar data associated with one or more of the extender node or a user associated with the extender node. The stationary status may include the status of an extender node as a stationary or a mobile device (e.g., a desktop computer or a smartphone), the status of an extender node being tethered (e.g., to another device, to a charging cord, etc.), and the like. Current and/or future calendar data may be based on current and/or future calendar data associated with an extender node and/or a user of an extender node. Trends in collections of historical data may be used to predict the likelihood of changes in availability and/or locations of an extender node, either alone or in combination with the stationary status or current or future calendar data. Trends in the collection of historical location data may be based on GPS data, past associations with wireless networks, past associations with access points on one or more wireless networks, and the like. Trends based on the collection of historical calendar data may be based on historical calendar data associated with an extender node and/or a user of an extender node. Trends based on the collection of historical availability data may be based on trend data based on prior utilization of the extender node. It is understood that variations in the predictive characteristics of interest, or alternative predictive characteristics of interest, may be utilized in accordance with embodiments herein.

The terms "announced behavior characteristic of interest" and "announced behavior COI" shall mean types of announced behavior related to an extender node.

The term "utilization information" shall mean information characterizing a load experienced by an extender node. Utilization information may include the processing capability of an extender node, system resource load experienced by the extender node (e.g., a processing load, a memory load, a power load, etc.), a percent utilization of system resources of the extender node. The utilization information may include an ensemble of utilization information values that are mathematically combined, such as through averaging, obtaining a mean, median, etc., to form a composite current utilization information value (e.g., a moving average).

The term "obtain" or "obtaining", as used in connection with data, signals, information and the like, includes at least one of i) accessing memory of an extender node or resource manager where the data, signals, information, etc. are stored, ii) receiving the data, signals, information, etc. over a wireless communications link between the wireless device and an extender node, and/or iii) receiving the data, signals, information, etc. at a resource manager over a network connection. The obtaining operation, when from the perspective of a wireless device, may include sensing new signals in real time, and/or accessing memory to read stored data, signals, information, etc. from memory within the wireless device. The obtaining operation, when from the perspective of an extender node, includes receiving the data, signals, information, etc. at a transceiver of the extender node where the data, signals, information, etc. are transmitted from a wireless device and/or a resource manager. The obtaining operation may be from the perspective of a resource manager, such as when receiving the data, signals, information, etc. at a network interface from an extender node and/or directly from a wireless device. The resource manager may also obtain the data, signals, information, etc. from local memory and/or from other memory, such as within a cloud storage environment and/or from the memory of a workstation.

System for Managing Extender Nodes for a Wireless Device

FIG. 1 illustrates a system 100 for managing extender nodes for a wireless device implemented in accordance with embodiments herein. Systems for managing extender nodes for wireless devices may limit (e.g., minimize) the number of switches (or renegotiations) associated with performing a request to route communications content. The system 100 includes one or more wireless devices 110 and a plurality of extender nodes 111. The system 100 may be implemented as a centralized system controlled by a resource manager 102 or as an ad-hoc system between collections of devices on a network. The system 100 also includes one or more resource managers 102 that manage and otherwise provide access to one or more data stores 150 containing a node database 134. The resource manager 102 communicates with wireless devices 110 and extender nodes 111 through one or more networks 112 to provide access to the data store 150. The network 112 may represent the World Wide Web, a local area network, a wide area network, a mobile communications network (e.g., a cellular network), and the like. The wireless device 110 may represent various types of electronic devices including, but not limited to, personal computers, tablet devices, laptop computers, embedded appliances (e.g., thermostats, home monitoring systems, and the like), smart watches, medical devices, vehicles, digital assistants, and an entire array of other smart consumer goods. The resource manager 102 may represent a server or other network-based or cloud-based computing environment. The resource manager 102 may represent a single computer system or a collection of computer systems located at a common location or geographically distributed.

The wireless device 110 includes one or more processors 114, memory 116, a display 118, a user interface 120, a network communications interface 122, and various other mechanical components, electrical circuits, hardware and software to support operation of the wireless device 110. The memory 116 includes an operating system and instructions to implement the processes described herein. The memory 116 also stores one or more application programs to implement a predictive application 124, as well as other software, information and data as described herein. For example, the memory 116 may maintain utilization information 126 related to the load experienced by the wireless device 110 and/or a node database 134. The node database 134 may include information regarding extender nodes 111 associated with one or more wireless networks associated with or accessible by the wireless device 110. The node database 134 may be implemented in any manner of data sources, such as data bases, text files, data structures, libraries, relational files, flat files and the like. For example, the node database 134 may include a list of extender nodes 111 associated with a network and corresponding predictive COI. The one or more processors 114 may update the utilization information 126 and/or the node database 134 periodically based on changes in location of the wireless device 110 and changes in the availability of the candidate extender nodes 111. Additionally or alternatively, the one or more processors 114 may receive updates to the node database 134 pushed to the wireless device 110 by the resource manager 102.

The predictive application 124 receive a request to route a communication stream for the wireless device. The request may be generated by any one of various applications stored in memory that either transmit or receive communications content (e.g., a movie streaming service, a gaming service, a telephone or video application, a messaging application, or the like). The predictive application 124 determines whether an access point (e.g., a router on a Wi-Fi network, a tower of a communications network, etc.) associated with the network is available and capable of supporting the request to route the communication stream (e.g., whether a signal from an access point is detected and/or whether the signal from the access point exceeds a threshold value to support the request). Based on determining than an access point is available and capable of supporting the request, the predictive application 124 negotiates a network connection with the access point and routes the communication stream associated with the request. However, based on determining that no access point is available and/or capable of supporting the request, the predictive application 124 performs operations to determine a resultant extender node from candidate extender nodes 111 to extend the range of the network while maintaining the user experience by limiting (e.g., minimizing) the number of switches (or renegotiations) associated with performing the request to route communications content. The process limits the number of switches by analyzing the candidate extender nodes 111 to determine, as the resultant extender node, the candidate extender node that is likely to remain stationary, or likely to remain stationary for the duration of the request, and that has a level of available system resources to support the type of communication stream associated with the request as further described below.

The predictive application 124 identifies request AOI associated with the request to route the communication stream. The predictive application 124 may identify the request AOI prior to or subsequent to determining whether an access point associated with the network is available. The predictive application 124 may analyze the request to determine the request AOI and/or the request AOI may be specified by a user of the wireless device 110. The request AOI may include one or more of a duration for routing the communication stream, one or more types of content associated with the communication stream, one or more types of services associated with the communication stream, or any other attribute that may be of interest in connection with managing switching of the wireless device during performance of the request. Managing switching may include limiting (e.g., minimizing) switching extender nodes during performance of the request.

The predictive application 124 detects a plurality of candidate extender nodes 111 capable of extending the network signal to the present location of the wireless device. The process may detect all detectable signals from all devices on the network having a radio and determine all or a subset of the devices having a detectable signal as the plurality of candidate extender nodes. Additionally or alternatively, the process may detect all detectable signals from extender nodes 111 (e.g., all devices having a radio) associated with the network and determine, as the plurality of candidate extender nodes, those extender nodes 111 having a detected network signal strength that exceeds the threshold value. For example, The predictive application 124 analyzes the plurality of candidate extender nodes 111 to determine predictive COI associated with the request AOI for the candidate extender nodes 111. Additionally or alternatively, the predictive application 124 analyzes the candidate extender nodes 111 to determine an announced behavior COI based on announced behaviors broadcast by one or more of the candidate extender nodes 111 (e.g., "I will be available as an extender node 111 at this location for the next 5 hours"). The predictive application 124 analyzes a candidate extender node by determining, as the predictive COI, one or more analyzed behaviors of the candidate extender node. Types of analyzed behavior include one or more of the past and/or predicted physical availability and/or resource availability of the candidate extender node. An analyzed behavior for an extender node may be based on statistical analysis of and/or trends based on one or more of a stationary status, a collection of historical location data, a collection of historical calendar data, a collection of historical availability data, current calendar data, or future calendar data associated with one or more of the extender node or a user associated with the extender node. Analysis based on collections of historical location data, historical calendar data, historical availability data, current calendar data, future calendar data, or other personal data may be performed by one or more processors implemented on the resource manager 102 and/or on the candidate extender node 111 based on privacy concerns. In one example, the predictive application 124 may determine predictive COI based on determining a stationary status of the candidate extender nodes 111 as corresponding to a stationary or fixed device (e.g., a desktop computer), a temporarily stationary or fixed device (e.g., a mobile device that is charging or tethered to a non-mobile device), or a non-stationary mobile device (e.g., a smartphone that is not charging). In another example, the predictive application 124 may determine predictive COI based on determining the likelihood that a device will remain at or near the current location based on one or more of historical location data (e.g., based on the device always being at the location or on the network on certain days and times), historical calendar data (e.g., based on the device always being at or absent from the location based on calendar entries), or current calendar data (e.g., based on having a meeting at or away from the location during the duration of the request). In another example, the predictive application 124 may determine predictive COI based on historical availability data (e.g., by using trends in system resource utilization to determine whether system resources will be available for the duration of the request).

The predictive application 124 determines a resultant extender node from the plurality of extender nodes 111 based, at least in part, on one or more of predictive COI or announced behavior COI corresponding to the candidate extender nodes. For example, the predictive application 124 may rank the candidate extender nodes at the present physical location of the wireless device 110 based on the predictive COI. For example, candidate extender nodes that are stationary may be ranked higher than candidate extender nodes that are mobile due to a higher likelihood of remaining available at the physical location. In a further example, candidate extender nodes that are temporarily stationary, such as laptop computers or charging mobile devices, may be ranked higher than candidate extender nodes that are non-stationary mobile devices but lower than stationary candidate extender nodes. In additional or alternative examples, the predictive application 124 may rank or further rank the candidate extender nodes based on a likelihood of availability based on statistical analysis or trends determined from collections of historical location, calendar, and availability data, alone or in further view of current calendar data.

The predictive application 124 determines the resultant extender node to be the candidate extender node having the highest likelihood of remaining available during and/or able to support the communication content associated with the request. For example, the predictive application 124 may determine the resultant extender node based on one or more of the predictive COI and the announced behavior COI. The predictive application 124 negotiates a connection with the resultant extender node 111 and processes the request to route the communication stream. In the event that the connection is terminated due to the unexpected or expected unavailability of the resultant extender node, the predictive application 124 repeats the process to select another resultant extender node to continue routing the communication stream.

The resource manager 102 includes one or more processors 104 and memory 106, among other structures that support operation of the resource manager 102. The memory 106 includes an operating system, instructions to manage the data store 150 and instructions to implement the methods described herein. The memory 106 may also store a node database 134 and/or utilization information 126 related to loads experienced by one or more resources of one or more candidate extender nodes 111. All or portions of the operations performed by the predictive application 124 may be managed by or performed on the resource manager 102 or a network resource (e.g., a router) associated with the network. The resource manager 102 may be a device associated with a cloud-based computing environment, an edge device associated with a network, and the like. The resource manager 102 may push updates to one or more wireless devices 110 periodically to update the client-side node database 134 implemented thereon. It is recognized that the resource manager 102 performs other operations, not described herein, such as operations associated with maintaining resources and the like.

Figure 2:
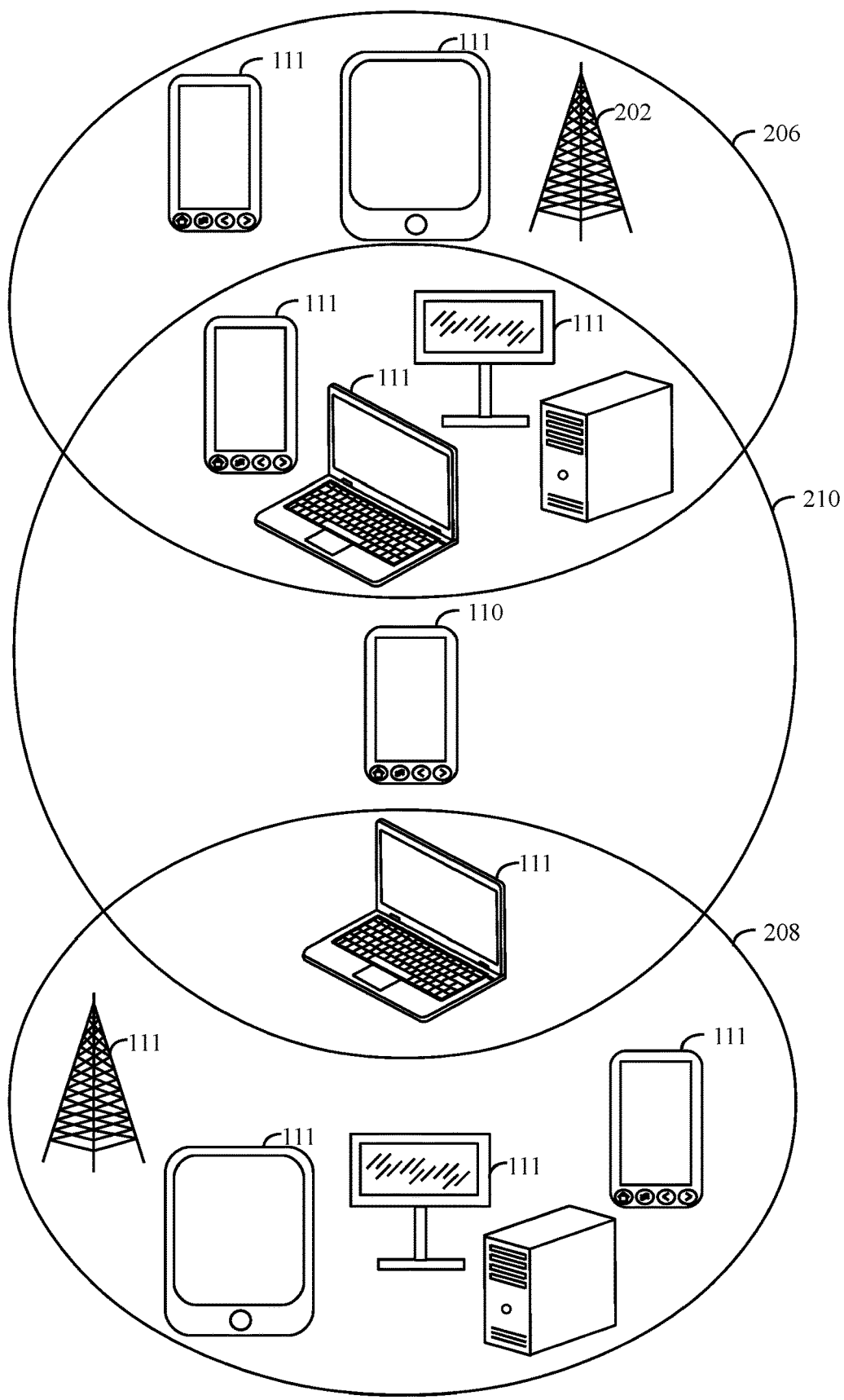
FIG. 2 illustrates an example implementation of the system of FIG. 1 in accordance with embodiments herein.

FIG. 2 illustrates an example implementation of the system of FIG. 1 in accordance with embodiments herein. In FIG. 2, the system 100 also includes a first network access point 202 and a second network access point 204. The first access point 202 has a first network signal range (indicated by dashed circle 206). A first plurality of candidate extender nodes 111 are connected to the network via connections negotiated directly with the first access point 202. The second access point 204 has a first network signal range (indicated by dashed circle 208). A second plurality of candidate extender nodes 111 are connected to the network via connections negotiated directly with the second access point 204. A wireless device 110 is positioned outside of the first network signal range 206 of the first network access point 202 and outside of the second network signal range 208 of the second network access point 204.

In accordance with embodiments herein, the wireless device 110 receives a request to route communications content generated by a communication application implemented thereon. The predictive application 124 (FIG. 1) receives the request to route the communication stream and identifies request AOI associated with the request. The request AOI may represent a duration associated with the request or types of content and/or services associated with the request. For example, the request AOI may indicate a duration of 10 minutes and the communication content may relate to internet browsing and transmitting email messages. In another example, the request AOI may indicate a duration of 5 hours and the communication content may relate to streaming gaming content. The predictive application 124 determines whether an access point associated with the network 112 is available. Based on the wireless device 110 having a current physical location that is outside of the respective ranges 206, 208 of the network signals of the first access point 202 and the second access point 204, the predictive application 124 determines that no access point is available to route the communication stream. Based on no access point availability, the predictive application 124 detects a plurality of candidate extender nodes capable of extending the network signal from either the first access point 202 or the second access point 204 to the current physical location of the wireless device 110. The predictive application 124 may detect all detectable signals from other devices configured to function as extender nodes (e.g., all devices having a radio) associated with the network 112. The predictive application 124 designates a plurality of the devices to be candidate extender nodes based on criteria, such as the devices having a detected network signal strength that exceeds a threshold value. For example, the predictive application 124 may designate the plurality of candidate extender nodes to be the subset of devices/extender nodes 111 (e.g., located within the dashed circle 210) because the subset has a detectable network signal strength that is above a selected threshold value (e.g., 45% of the full network signal strength). The predictive application 124 analyzes the candidate extender nodes 111 (within the dashed circle 210) to determine one or more predictive COI associated with the extender node 111 relative to the request AOI. For example, the predictive application 124 determines, as the predictive COI, a stationary status for the workstation that is connected to the network 112 via the first access point 202, a temporary stationary status for the laptops, and a non-stationary status for the tablet. Based on ranking the predictive COI, the predictive application 124 determines that the workstation is the most likely candidate extender node to remain stationary for the duration of the request, selects the workstation as the resultant extender node, and negotiates a network connection via the workstation.

In an additional or alternative example, the workstation may broadcast an announced behavior COI indicating that the workstation is unavailable during at least a portion of the duration of the request. Based on the announced unavailability of the workstation, the predictive application 124 continues to analyze and determine predictive COI for the laptops and the tablet. The predictive application 124 may select the tablet as the resultant extender node based on determining and ranking additional predictive COI associated with the laptops and the tablet. For example, the predictive application 124 may determine that, based on historical location data, that the two laptops are unlikely to remain in the location (e.g., a coffee shop) for the duration of the request despite the two laptops having a temporary stationary status due to being plugged in to a power source, but that the tablet device (e.g., belonging to a coffee shop employee) is likely to remain in the location for the duration of the request. Accordingly, the predictive application 124 selects the tablet as the resultant extender node and negotiates a network connection via the tablet.

Process for Managing Extender Nodes

Figure 3:
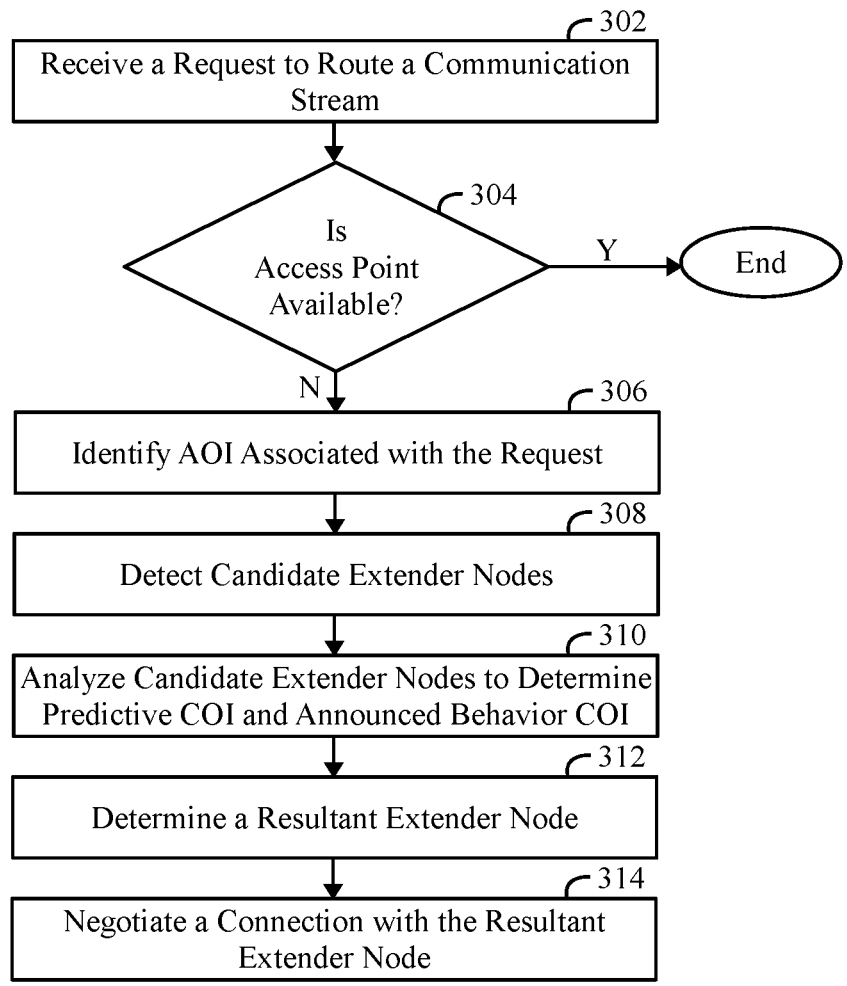
FIG. 3 illustrates an example processes for managing extender nodes for a wireless device in accordance with embodiments herein.

FIG. 3 illustrates a process 300 for managing extender nodes for a wireless device in accordance with embodiments herein. The operations of FIG. 3 may be implemented on an ad-hoc and/or a centralized basis by processors (e.g., the processors 104 and 114), hardware and circuits within the systems described in the various embodiments herein. The operations of FIG. 3 may be performed continuously or periodically. For simplicity purposes, the operations of FIG. 3, will be described in connection with one request, however it is recognized that a wireless device 110 may provide multiple requests in connection with managing extender nodes. Optionally, the operations of FIG. 3 may be performed upon select requests from a wireless device 110, upon every request from a wireless device 110, upon groups of requests from a wireless device 110 or otherwise. Optionally, the operations of FIG. 3 may be performed in parallel for multiple wireless devices 110 on one or more resource managers 102.

At 302, one or more processors receive a request to route a communication stream for a wireless device. The request may be provided in connection with various types of operations and from various types of applications implemented on the wireless device 110. For example, a wireless device 110 (e.g., a smart phone, laptop computer, smartwatch, or the like) may operate any one of various applications stored in memory that either transmit or receive communications content (e.g., a movie streaming service, a gaming service, a telephone or video application, a messaging application, or the like). Based on the wireless device 110 generating the request to route the communication stream, flow moves to 304.

At 304, the one or more processors determine whether an access point associated with the network is available and capable of supporting the request to route the communication stream. For example, the process detects whether a network signal from an access point associated with the network exists and whether the strength of a detected network signal exceeds a threshold value (e.g., 50% of the full network signal strength). Based on determining a network signal from an access point exists and is capable of supporting the request (e.g., the network signal strength exceeding the threshold value), the process ends. Based on determining that no network signal from an access point is available and/or capable of supporting the request (e.g., the network signal strength falls below the threshold value), the process determines an extender node is needed to support the request to route the communication stream. Based on determining an extender node is needed to support the request, flow moves to 306.

At 306, the one or more processors identify request AOI associated with the request to route the communication stream for the wireless device. The request AOI may include one or more of a duration for routing the communication stream, one or more types of content associated with the communication stream, one or more types of services associated with the communication stream, or any other attribute that may be of interest in connection with managing switching of the wireless device 110 during performance of the request. The process may determine the request AOI by analyzing the request to route the communication stream. For example, the process may identify a duration for routing the communication stream based on one or more of a calendar entry for a meeting at the location (e.g., ending three hours from a time the request was made). In another example, the process may identify a duration based on past device location data by determining that the user typically changes location at a particular time (e.g., the end of the workday). Additionally or alternatively, the user may specify one or more of the durations associated with the request, the types of content and/or the types of services associated with the request, such as in response to prompts. For example, upon determining that an extender node 111 is needed, the predictive application 124 may prompt the user to indicate the duration that the user will remain at the location and what types of content and/or services the user plans to engage in during that time (e.g., stream a movie, stream gaming content, read and send email messages, engage in a phone call, etc.). Additionally or alternatively, the predictive application 124 may determine the request AOI based on an analysis of the request, and present the request AOI to the user, and prompt the user to confirm or adjust the request AOI.

At 308, the one or more processors detect a plurality of candidate extender nodes 111 capable of extending one or more network signals to the present location of the wireless device. The process may detect all detectable signals from all devices on the network having a radio and designate all or a subset of the devices, that have a detectable signal, as candidate extender nodes. Additionally or alternatively, the process may detect all detectable signals from extender nodes 111 (e.g., all devices having a radio) and determine, as the plurality of candidate extender nodes, those extender nodes having a detected network signal strength that exceeds the threshold value. For example, the process may detect the plurality of candidate extender nodes 111 based on detecting extender nodes having a network signal strength exceeding a threshold value (e.g., at least 70% of the full network signal strength for the extender node). The extender nodes 111 may be positioned between the access point and the wireless device 110 and may broadcast the network signal in two or more directions (e.g., towards the access point and towards the wireless device). Based on broadcasting the network signal in two or more directions, the full network signal strength for the extender device may represent less than the full network signal strength for the access point (e.g., 50% of the full network signal strength for an access point). Additionally or alternatively, the threshold value of the network signal strength for the extender node 111 may be based on the request AOI, such as a threshold based on the types of content and/or services associated with the communication stream. Based on detecting the plurality of candidate extender nodes 111 capable of extending the network signal at the current physical location of the wireless device, flow moves to 310.

At 310, the one or more processors analyze the candidate extender nodes 111 to determine predictive COI associated with the request AOI for the candidate extender nodes 111. Additionally or alternatively, the one or more processors analyze the candidate extender nodes 111 to determine an announced behavior COI based on announced behaviors broadcast by one or more of the candidate extender nodes.

The process analyzes a candidate extender node 111 by determining, as the predictive COI, one or more analyzed behaviors of the candidate extender node. Types of analyzed behavior may correspond to one or more of the past and/or predicted physical availability and/or resource availability of the extender node. An analyzed behavior for an extender node 111 may be based on statistical analysis of and/or trends based on one or more of a stationary status, a collection of historical location data, a collection of historical calendar data, a collection of historical availability data, current calendar data, or future calendar data associated with one or more of the extender node 111 or a user associated with the extender node.

The process analyzes a candidate extender node 111 by determining, as the announced behavior COI, one or more announced behaviors broadcast by one or more of the candidate extender nodes. The candidate extender node 111 may broadcast announced behaviors indicative of the times and/or conditions under which the candidate extender node 111 available to act as an extender on the network. The one or more processors of the wireless device 110 may receive announced behaviors broadcast by one or more candidate extender nodes and determine announced behavior COI based thereon. For example, a user, administrator, or communications service provider associated with a candidate extender node 111 may specify times and/or conditions (e.g., restrictions on the amount of resources available for the extender node 111 function) for availability of the candidate extender node 111 to act as an extender. A user of the candidate extender node 111 or a network administrator may have to select an option (e.g., an option in the predictive application 124 implemented on the candidate extender node 111 or resource manager 102) to enroll the candidate extender node in a program associated with the communications service provider or network to act as an extender. In some examples, a communications service provider may require the candidate extender node 111 to act as an extender under certain conditions as a condition of service and/or compensate a user or entity associated with the candidate extender node 111 for acting as an extender for the network (e.g., a program for compensating or otherwise incentivizing device users to allow use of wireless endpoint devices or other devices with radios as network extenders to cover 5G dead spots for the communications service provider). The predictive application 124 may determine default settings for and/or prompt the user of the candidate extender node 111 to indicate settings for the duration the candidate extender node 111 will be available to act as an extender node 111 and the level of system resources available for acting as an extender node. Additionally or alternatively, the predictive application 124 may determine the default settings or suggested settings based on analyzing historical and current statuses, locations, and availability of the candidate extender node, present the default settings to the user, and prompt the user to confirm or adjust the default settings.

In accordance with embodiments herein, based on request AOI including a duration of two hours, the process analyzes the plurality of extender nodes 111 to determine predictive COI and announced behavior COI indicative of the availability of the extender node 111 for at least two hours from the time of the request. The process may transmit a query to the plurality of candidate extender nodes 111 and/or a resource manager associated with the network and receive data therefrom. The data may include one or more of an announced behavior, a stationary status, a collection of historical location data, a collection of historical calendar data, a collection of historical availability data, current calendar data, or future calendar data associated with one or more of the extender node 111 or a user associated with the extender node. Analysis of the data may take place at the wireless device. Additionally or alternatively, analysis of the data may take place on the candidate extender node 111 or on a resource manager associated with the network. The data may be analyzed to determine, based on statistics and/or trends, the probability or likelihood that individual candidate extender nodes 111 will remain available for at least two hours from the time of the request. For example, data corresponding to the stationary status of a candidate extender node 111 may indicate that the device is likely to remain stationary for at least the following two hours based on the candidate extender node 111 being a non-mobile device (e.g., a desktop computer, a smart TV, etc.), being tethered (e.g., tethered to a charging cord, tethered to another non-mobile device, etc.). Conversely, the data corresponding to stationary status of a candidate extender node 111 may indicate that further analysis is required, based on a non-tethered status, to determine whether the candidate extender node 111 is likely to remain stationary or in the same approximate location for at least the following two hours.

In additional or alternative examples, data corresponding to one or more of collections of historical location data, historical calendar data, or historical availability data may be analyzed, either alone or in light of current or future calendar data, to determine the likelihood of the candidate extender node 111 remaining stationary, in the same approximate location, or otherwise available as an extender node 111 during the following two hours. Historical location data may be analyzed to indicate trends in the movement of the candidate extender node 111 and used to indicate the likelihood of the candidate extender node 111 remaining stationary or in the same approximate location for the following two hours. For example, based on GPS data or network-based location data indicating that the candidate extender node 111 is typically available on the network or in the location during workdays from 9 a.m. until 5 p.m., the process may determine the likelihood of the candidate extender node 111 remaining stationary or in the same approximate location based on the time and duration of the request. In a further example, the historical location data may be combined with current or future calendar data to determine that, based on one or more calendar entries, the candidate extender node 111 is likely to be available for less time (e.g., based on a calendar entry for an appointment or meeting away from the location) or for more time (e.g., based on a calendar entry for a meeting in a conference room at work extending past 5 p.m.). In another example, based on historical calendar data indicating a recurring appointment (e.g., every Wednesday from 10 a.m. to 1 p.m.) at a location on the network, alone or combined with historical location data corresponding to the location, the process may determine the likelihood of the candidate extender node 111 remaining stationary and available for based on the time and duration of the request. In yet another example, historical availability data may be analyzed to indicate trends in the resource availability of the candidate extender node 111 and used to indicate the likelihood of the candidate extender node 111 remaining available for the following two hours. For example, based on utilization information indicating that the candidate extender node 111 is typically running one or more processes that consume significant system resources (e.g., a gaming application, etc.) between the hours of 7 p.m. until 11 p.m. but having available system resources outside of that time period, the process may determine the likelihood of the candidate extender node 111 remaining stationary and available based on the time and duration of the request.

At 312, the one or more processors determine a resultant extender node 111 from the plurality of candidate extender nodes. The resultant extender node 111 is determined pursuant to managing switching during performance of the request. Managing switching of the request may include limiting (e.g., minimizing) the number and/or the likelihood of network switches associated with the request (e.g., during performance of the request.) Limiting the number and/or likelihood of switches (or renegotiations) associated with the request avoids or reduces adverse impact on the user experience during the communication session due to, for example, dropped connections and lags due to renegotiating network connections with different extender nodes. The process determines the resultant extender node 111 based, at least in part, on one or more of the predictive COI or the announced behavior COI.

In one example, the resultant extender node 111 may be determined based at least partially on the predictive COI. The process may determine the resultant extender node 111 based on ranking the likelihoods of the candidate extender nodes 111 to remain stationary and/or available based on the time and duration of the request. For example, the process may prioritize a list of candidate extender nodes 111 based on their current availability and the likelihoods of the candidate extender nodes 111 to remain stationary and/or available. The process may determine a resultant extender node 111 to correspond to a stationary desktop computer connected to a network where the remaining candidate extender nodes 111 are mobile devices. The process may determine a resultant extender node 111 to correspond to a tablet having a tethered status, alone or in combination with a current battery charge level (e.g., 10%), where the remaining extender nodes 111 are mobile nodes having an un-tethered status. Where no candidate extender node 111 is stationary or tethered, the process may determine the resultant extender node 111 to be a candidate extender node 111 having predictive COI indicating a likelihood to remain stationary or in the same approximate location for the duration of the request base. In additional or alternative examples, based on the request AOI indicating types of content and/or the types of services requiring relatively high system resources (e.g., streaming video and/or gaming content), the process may prioritize a list of candidate extender nodes 111 based on their ability to route the communication stream over the duration of the request. The process may determine a resultant extender node 111 to correspond to a stationary desktop computer having the highest level of available resources (e.g., processing capability, memory, power) where the remaining candidate extender nodes 111 are mobile devices having lower available resources. The process may determine a resultant extender node 111 to correspond to a laptop computer having the highest level of available system resources, where the remaining extender nodes 111 have lower levels of available system resources (e.g., a smart speaker, a smart watch, a smartphone). Based on the process determining that more than one candidate extender node 111 is likely to remain stationary and available for the duration of the request, the process may select the candidate extender node 111 with the strongest network signal and/or the highest level of available system resources as the resultant extender node.

Continuing with the example and based on receiving the announced behaviors, alone or in addition to the predictive COI for the plurality of candidate extender nodes, the process determines the resultant extender node 111 from the plurality of candidate extender nodes. The process may prioritize a list of candidate extender nodes 111 based on one or more of the corresponding current availabilities, announced behaviors, or the likelihoods of remaining stationary and/or available. The process may determine a resultant extender node 111 to correspond to a stationary desktop computer connected to a network where the stationary desktop broadcasts availability as an extender node 111 on the network, and the remaining candidate extender nodes 111 correspond to tethered or untethered mobile devices. The process may determine a resultant extender node 111 to correspond to a laptop having an untethered status and a battery charge level of 50% but that broadcasts availability as an extender node, where the remaining extender nodes 111 are mobile nodes having less available system resources and an un-tethered status. Based on the process determining that more than one candidate extender node 111 is likely to or is announced to remain stationary and available for the duration of the request, the process may select the candidate extender node 111 with the strongest network signal and/or the highest level of available system resources as the resultant extender node.

At 314, the one or more processors negotiate a connection with the resultant extender node 111 and process the request to route the communication stream. In the event that the connection is terminated due to the unexpected or expected unavailability of the resultant extender node, the process repeats to select another resultant extender node. Accordingly, the process limits (e.g., minimizes) the number of switches (or renegotiations) associated with performing a request to route communications content. The process limits the number of switches by analyzing the plurality of candidate extender nodes 111 to determine, as the resultant extender node, the candidate extender node 111 that is likely to remain stationary, or likely to remain stationary for the duration of the request, and that has a level of available system resources to support the type of communication stream associated with the request.

Figure 4:
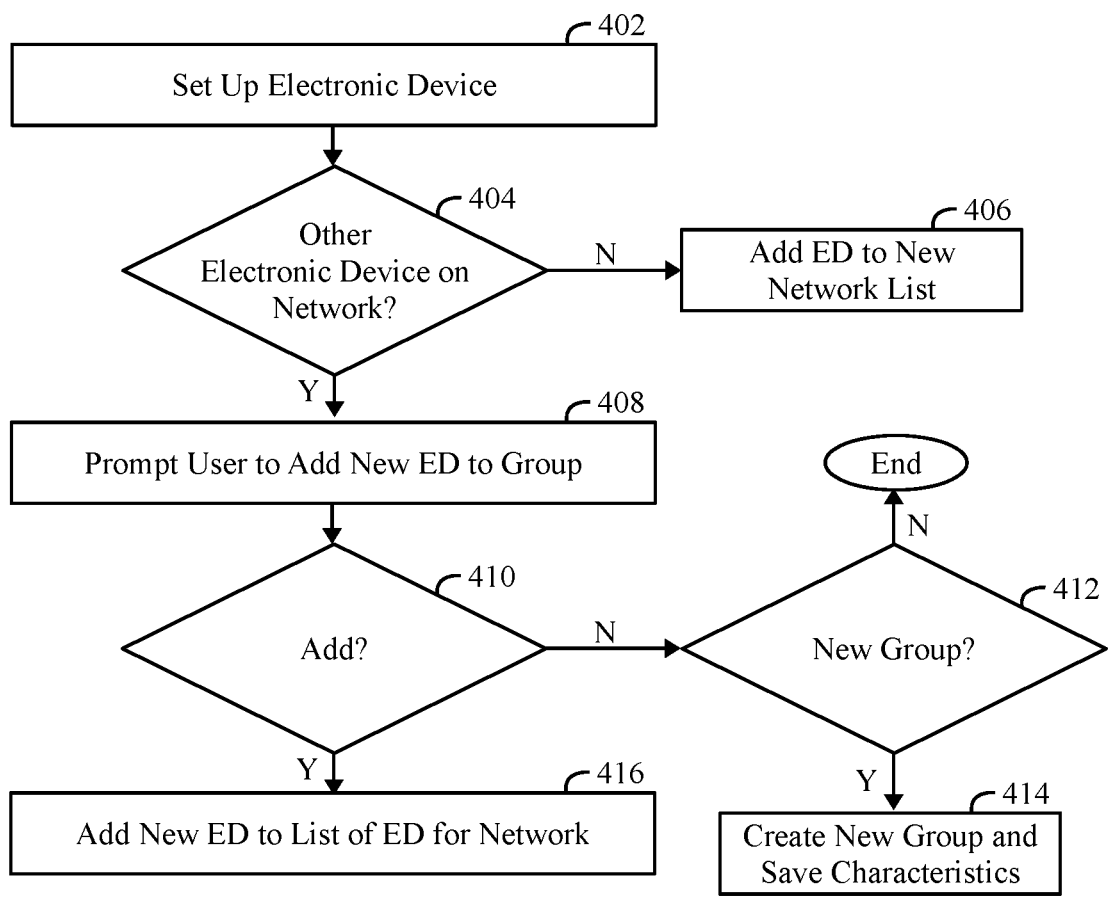
FIG. 4 illustrates an example process for managing extender nodes for a wireless network in accordance with embodiments herein.

FIG. 4 illustrates an example process for registering extender nodes 111 with a network 112 in accordance with embodiments herein. The process for registering extender nodes 111 may be useful in centralized implementations of the system of FIG. 1 and the process of FIG. 3. The operations of FIG. 4 may be performed by one or more processors of a new extender node 111 111 being registered and/or by a resource manager 102 already registered on a network and/or by one or more remote resource managers accessible via the network 112. At 402, an extender node 111 is initially set up. For example, one or more processors of the extender node 111 and/or resource manager may step through a series of questions and operations to collect various information, such as user preferences, network ID information, an environment where the extender nodes 111 are located, predictive COI associated with the extender node, one or more announced behavior associated with the extender node, and the like. At 404, the one or more processors determine whether other extender nodes 111 already exist on the network. When no other extender nodes 111 exist on the network, flow moves to 406 where a new network list is created, and the new extender node 111 is automatically added to the newly created list. Operational information concerning the new extender node 111 is also stored with the list, such as a device identifier, device hardware/software capabilities and functionality, hardware/software versions, connections to other devices (e.g., televisions, appliances, stereo systems, security circuits, locking circuits, thermostats and the like), a stationary or mobile status, a charging status, and the like.

Returning to 404, when other extender nodes 111 already exist on the network 112, flow moves to 408. At 408, the one or more processors determine whether to add the new extender node 111 to a group of extender nodes 111 associated with the network. As a further option, the one or more processors may obtain more specific information concerning one or more subgroups of the group of extender nodes 111 based on a region or zone within the environment (e.g., an upstairs zone and a downstairs zone, zones in a communications network map, etc.). For example, the one or more processors may indicate whether to include the newly added extender node 111 to a downstairs zone of a house or to select zones in a communications network map.

At 410, the one or more processors determine whether to add the new extender node 111 to the existing group and/or subgroups based on the determination made at 408. When the new extender node 111 is not to be added to an existing group, flow moves to 412. Otherwise flow advances to 416. At 412, the one or more processors determine whether to create a new group or subgroup. If not, the process ends without adding the new extender node 111 to any group/list. When a new group or subgroup is to be created at 412, flow moves to 414. At 414, the one or more processors step through operations to create a new group and/or subgroup that includes the newest extender node, and one or more characteristics of the group and/or subgroup and predictive COI and/or announced behaviors related to the extender node 111 are saved with the new group list.

Returning to 410, when the new extender node 111 is to be added to the total group of extender nodes 111 on the network, flow moves to 416. At 416, the one or more processors add the new extender node 111 to the node database 134 (e.g., a list) of extender nodes 111 associated with an existing network. Predictive COI and/or announced behaviors associated with the new extender node 111 are also added to the list.

Closing Statements

In accordance with at least one embodiment herein, to the extent that wireless and/or mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general-purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming.

The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B. For the avoidance of doubt, the claim limitation "one or more of: i) predictive COI associated with the corresponding candidate extender node of the candidate extender nodes; and ii) an announced behavior COI broadcast by one or more candidate extender nodes of the candidate extender nodes" means and shall encompass "i) predictive COI associated with the corresponding candidate extender node of the candidate extender nodes", "ii) an announced behavior COI broadcast by one or more candidate extender nodes of the candidate extender nodes" and/or "iii) predictive COI associated with the corresponding candidate extender node of the candidate extender nodes and an announced behavior COI broadcast by one or more candidate extender nodes of the candidate extender nodes."

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
under control of one or more processors configured with specific executable program instructions:
identifying request attributes of interest (AOI) associated with a request to route a communication stream for a wireless device;
detecting, at a current physical location of the wireless device, candidate extender nodes to extend a network signal;
analyzing the candidate extender nodes, based on the request AOI, to determine one or more of:
i) predictive characteristics of interest (COI) associated with a corresponding candidate extender node of the candidate extender nodes; and
ii) an announced behavior COI broadcast by one or more of the candidate extender nodes; and
determining a resultant extender node from the candidate extender nodes based, at least in part, on one or more of the predictive COI and the announced behavior COI, the resultant extender node to manage switching during performance of the request.

2. The method of claim 1, wherein the predictive COI is indicative of whether the corresponding candidate extender node is likely to remain available during performance of the request to route the communication stream, and wherein the determining includes determining the resultant extender node from the candidate extender nodes to limit a number of network switches utilized with the request.

3. The method of claim 1, wherein analyzing includes determining one or more analyzed behaviors of a candidate extender node.

4. The method of claim 3, wherein the analyzed behavior is determined based on one or more of a stationary status, a collection of historical location data of the candidate extender node, a collection of historical calendar data of the candidate extender node, a collection of historical availability data of the candidate extender node, current calendar data of the candidate extender node, or future calendar data associated with one or more of the candidate extender node or a user associated with the candidate extender node.

5. The method of claim 1, wherein the announced behavior is based on one or more of a user-selected status or a user-selected schedule.

6. The method of claim 1, wherein the predictive COI is not an IP address reservation.

7. The method of claim 1, wherein determining further comprises ranking the candidate extender nodes based on the predictive COI and selecting, as the resultant extender node, a highest-ranking candidate extender node.

8. The method of claim 1, wherein the one or more AOI include a duration for routing the communication stream, one or more types of content associated with the communication stream, or one or more types of services associated with the communication stream.

9. The method of claim 1, wherein detecting includes detecting the candidate extender nodes having a signal strength exceeding a threshold value.

10. A device, comprising:
one or more processors;
memory storing program instructions accessible by the one or more processors, wherein, responsive to execution of the program instructions, the one or more processors:
identify request attributes of interest (AOI) associated with a request to route a communication stream for a wireless device;
detect, at a current physical location of the wireless device, candidate extender nodes to extend a network signal;

analyze the candidate extender nodes, based on the request AOI, to determine one or more of:
i) predictive characteristics of interest (COI) associated with a corresponding candidate extender node of the candidate extender nodes; and
ii) an announced behavior COI broadcast by one or more of the candidate extender nodes; and
determine a resultant extender node from the candidate extender nodes based, at least in part, on one or more of the predictive COI and the announced behavior COI, the resultant extender node to manage switching during performance of the request.

11. The device of claim 10, wherein the predictive COI is indicative of whether the corresponding candidate extender node is likely to remain available during performance of the request to route the communication stream, and wherein the one or more processors, as part of the determine, determine the resultant extender node from the candidate extender nodes to limit a number of network switches associated with the request.

12. The device of claim 10, wherein the one or more processors, as part of the analyze, determine one or more analyzed behaviors of a candidate extender node as predictive COI.

13. The device of claim 12, wherein the one or more processors determine one or more analyzed behaviors based on one or more of a stationary status, a collection of historical location data of the candidate extender node, a collection of historical calendar data of the candidate extender node, a collection of historical availability data of the candidate extender node, current calendar data of the candidate extender node, or future calendar data associated with one or more of the candidate extender node or a user associated with the candidate extender node.

14. The device of claim 10, wherein the announced behavior is based on one or more of a user-selected status or a user-selected schedule.

15. The device of claim 10, wherein the predictive COI is not an IP address reservation.

16. The device of claim 10, wherein the one or more processors, as part of the determine, rank the candidate extender nodes based on the predictive COI and selecting, as the resultant extender node, a highest-ranking candidate extender node.

17. The device of claim 10, wherein the one or more AOI include a duration for routing the communication stream, one or more types of content associated with the communication stream, or one or more types of services associated with the communication stream.

18. A computer program product comprising a non-transitory signal computer readable storage medium storing comprising computer executable code to:
identify request attributes of interest (AOI) associated with a request to route a communication stream for a wireless device;
detect, at a current physical location of the wireless device, candidate extender nodes to extend a network signal;
analyze the candidate extender nodes, based on the request AOI, to determine one or more of:
i) predictive characteristics of interest (COI) associated with a corresponding candidate extender node of the candidate extender nodes; and
ii) an announced behavior COI broadcast by one or more of the candidate extender nodes; and
determine a resultant extender node from the candidate extender nodes based, at least in part, on one or more of the predictive COI and the announced behavior COI, the resultant extender node to manage switching during performance of the request.

19. The computer program product of claim 18, wherein the predictive COI is indicative of whether the corresponding candidate extender node is likely to remain available during performance of the request to route the communication stream, and wherein the computer executable code is further configured to, as part of the determine, determine the resultant extender node from the candidate extender nodes to limit a number of network switches associated with the request.

20. The computer program product of claim 18, wherein the computer executable code is further configured to, as part of the analyze, determine one or more analyzed behaviors of a candidate extender node, as predictive COI, based on one or more of a stationary status, a collection of historical location data of the candidate extender node, a collection of historical calendar data of the candidate extender node, a collection of historical availability data of the candidate extender node, current calendar data of the candidate extender node, or future calendar data corresponding to the candidate extender node.

* * * * *